United States Patent [19]

Shigaki

[11] Patent Number: 4,939,539
[45] Date of Patent: Jul. 3, 1990

[54] PRINT SIZE ADJUSTING METHOD

[75] Inventor: Takao Shigaki, Kanagawa, Japan

[73] Assignee: Fuji Photo Film Co., Ltd., Kanagawa, Japan

[21] Appl. No.: 359,901

[22] Filed: Jun. 1, 1989

[30] Foreign Application Priority Data

Jun. 1, 1988 [JP] Japan .................... 63-134609

[51] Int. Cl.$^5$ .................... G03B 29/00; G03B 27/32
[52] U.S. Cl. .................... 355/77; 355/29; 355/74
[58] Field of Search .................... 355/28, 29, 77, 74, 355/50, 51

[56] References Cited

U.S. PATENT DOCUMENTS

| | | | |
|---|---|---|---|
| 4,576,469 | 3/1986 | Shiga et al. | 355/29 |
| 4,605,300 | 8/1986 | Thaddey | 355/29 |
| 4,618,251 | 10/1986 | Yanagawa et al. | 355/29 X |
| 4,745,442 | 5/1988 | Oshikoshi et al. | 355/29 X |
| 4,806,983 | 2/1989 | Satou | 355/29 |
| 4,837,601 | 6/1989 | Nakane et al. | 355/29 X |
| 4,857,962 | 8/1989 | Satou | 355/29 |

*Primary Examiner*—Richard A. Wintercorn
*Attorney, Agent, or Firm*—Sughrue, Mion, Zinn, Macpeak & Seas

[57] ABSTRACT

A method of making a print by the use of a photographic printer in which a variable masking frame is changed in size by a pulse motor and a photographic paper is transported by a pulse motor. When taking $\alpha_c$, $\alpha_p$, K1 and K2, and $P_{fo}$ for a correction value common to all print sizes, a correction value for a specific print size, a constant, and a number of drive pulses obtained by dividing an actually transported distance of the photographic paper by a distance $d_f$ of transportation per one pulse, respectively, the corrected number of drive pulses $P_f$ applied to the pulse motor for controlling the photographic paper is obtained by calculating the following expression:

$$P_f = (\alpha_c/K1) \times (\alpha_p/K2) \times P_{fo}$$

When taking $\beta_c$, $\beta_p$, K3 or K4, and $P_{mo}$ for a correction value common to all print sizes, a correction value for a specific print size, a constant, and a number of drive pulses obtained by dividing a moved distance of the masking frame by a distance $d_m$ of movement of the masking frame per one pulse, respectively, the corrected number of drive pulses $P_m$ for controlling the masking frame is obtained by calculating the following expression:

$$P_m = P_{mo} + (\beta_c - K3) + (\beta_p - K4)$$

6 Claims, 5 Drawing Sheets

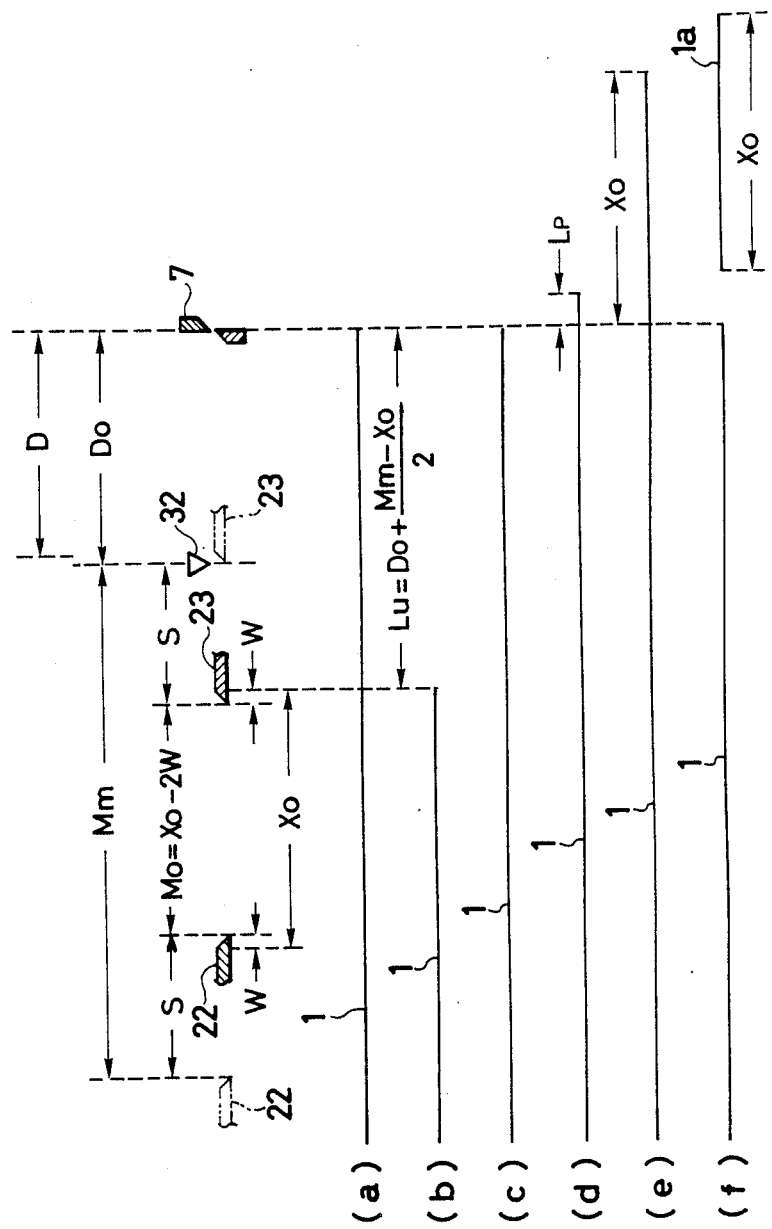

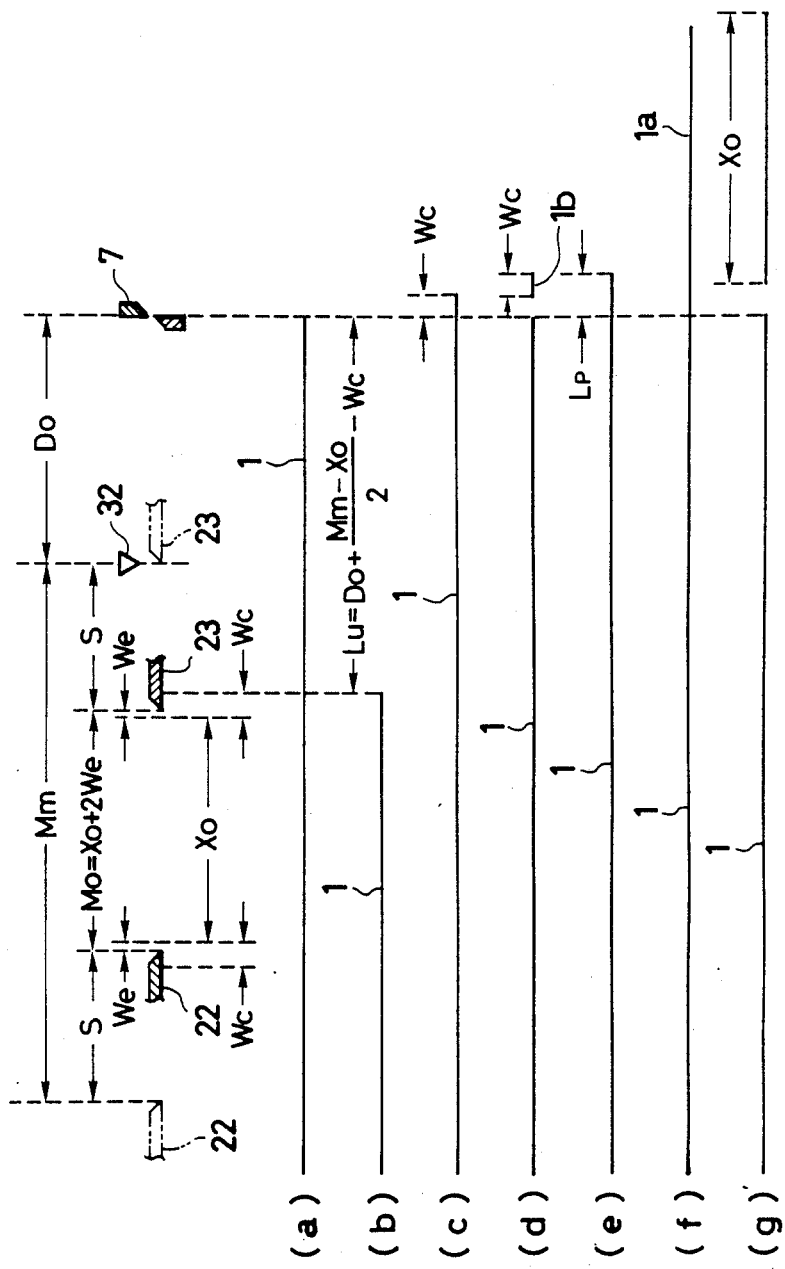

PRINT SIZE ADJUSTING METHOD

BACKGROUND OF THE INVENTION

The present invention relates to a method of making a standard size photographic print, and more particularly, to a method of correctly adjusting the size of prints to a desired standard size.

In conventional photographic printers, the leading end of a withdrawn part of a photographic paper in the form of a roll is, after exposure at an exposure station of the printer, further withdrawn to a cutter and cut by the cutter to a separate print. The photographic paper is thereafter rewound or moved back so that the leading part of the photographic paper is positioned at the exposure station for another exposure. One such printer is described in, for example, Japanese Utility Model Registration Publication No. 62-13,073. The printer described in the Publication is conveniently used, in particular, to intermittently make a small number of prints or to make relatively large size prints such as quarter size (254×305 mm) prints. It is well known to incorporate in the printer a variable masking frame which changeably defines an exposure area for the photographic paper so as to make various sizes of prints.

Pulse motors are used to drive a photographic paper transport mechanism and a variable masking frame adjusting mechanism independently from each other so as to make various standard sizes of prints. Because of various errors in assembling component parts, dimensional and/or functional errors or changes of the component parts, changes of the component parts due to age, and the replacement of the component parts, a practical printer does not always adjust prints to desired standard sizes.

More specifically, rollers for transporting the photographic paper will be subjected to changes in friction coefficient and worn due to slippage caused therebetween or between the photographic paper. This leads to substandard size prints.

To avoid the occurrence of such an error, the number $P_f$ of pulses applied to a pulse motor for transporting a photographic paper is obtained as follows:

$$P_f = \alpha \times P_{fo}$$

where $\alpha$ is a correction value; and $P_{fo}$ is the number of pulses applied to the pulse motor.

The correction value $\alpha$ is individual to the printer and determined based on the ratio of an actual or apparent length X of a print relative to a desired length $X_o$ of the print. The number of drive pulses $P_{fo}$ is determined by dividing a length $d_f$ by which the photographic paper is practically transported by a distance $d_{fo}$ of movement of the photographic paper per pulse theoretically designed.

A variable masking frame unit includes a pair of masking members that are connected to and driven by a pulse motor through a timing belt so as to move apart from and close to each other, thereby changing the size of a masking opening of the variable masking frame unit. Because of an assembling error, the variable masking frame unit is sometimes incorrectly adjusted in mask opening size, resulting in a substandard size print.

For this reason, the mask opening of the conventional variable masking frame unit is adjusted by correcting the number of pulses applied to the pulse motor by using the following expression:

$$P_m = P_{mo} + \beta$$

where $\beta$ is a correction value; and $P_{mo}$ is the number of pulses applied to the pulse motor.

The correction value $\beta$ is individual to the printer but independent from print sizes, and defined by dividing the difference $(M - M_o)$ between the length M of an image area of an actual print and the desired length $M_o$ of an image area of the print by a value as great as a distance $d_m$ per pulse by which the pair of frame members moves apart from or close to each other. The number $P_{mo}$ of drive pulses is defined by dividing a distance which is required for each of the pair of frame members to move from a reference or original position of the frame members to a position where the frame members form a desired masking opening by the distance $d_m$ per pulse.

The variable masking frame unit is so constructed as to vary the size of a masking opening by shifting frame members with respect to their reference positions and the photographic paper is moved by a distance that is determined on the basis of the reference position. A position sensor is provided to the masking frame member at the reference position. Due to the fact that a location where the position sensor is assembled in the printer is sometimes different from a theoretical or designed position or that the center of the masking opening of the masking frame unit is not always identical with the axis of a printing optical system, prints made by the printer result in having image areas different in position from the prints from one another and, having therefore different widths of front and rear end margins. Such position error can be avoided by adjusting a distance by which the leading end of the photographic paper is moved back and a distance by which the photographic paper is forwarded to be cut. The following expression has been used to obtain an apparent distance D between the reference position where the masking opening is the largest and the cutter as a parameter for determining a transportation length of the photographic paper:

$$D = D_o + \gamma$$

where $D_o$ is a designed distance between the reference position where the masking opening is the largest and the cutter: and $\gamma$ is a correction value.

A problem in association with the above-described manner, when correction values $\alpha$, $\beta$ and $\gamma$ are set for certain standard size print, is that errors in size still occur in different size prints. Therefore, it is impossible for the conventional printers to make prints meeting possible standard sizes.

SUMMARY OF THE INVENTION

It is, therefore, an object of the present invention to provide a method of making any standard size of prints.

The above object of the present invention is achieved by a method of making a print by the use of a photographic printer having a variable masking frame at an exposure position. A mask opening is varied by means of a pulse motor, a transporting system includes a pulse motor for transporting photographic paper after exposure, and a cutter is located apart from the exposure position. Each print is made by exposing the photographic paper after moving back a leading end of the photographic paper from the cutter and then forwarding the exposed photographic paper to the cutter for separating an exposed part as a print from the photographic paper.

According to a preferred embodiment of the present invention, the pulse motor for the photographic paper is applied with a corrected number of drive pulses $P_f$ so as to control the length of advancement of the photographic paper. When taking $\alpha_c$, $\alpha_p$, K1 or K2, and $P_{fo}$ for a correction value common to all print sizes, a correction value for a specific print size, a constant which is any integer other than 0 (zero), and a number of drive pulses obtained by dividing a distance of transportation of the photographic paper by a distance $d_f$ of transportation of the photographic paper per one pulse, the number of drive pulses $P_f$ is obtained by calculating the following expression:

$$P_f = (\alpha_c/K1) \times (\alpha_p/K2) \times P_{fo}$$

The pulse motor for the masking frame is applied with a corrected number of drive pulses $P_m$ so as to adjust the masking opening of the masking frame. When taking $\beta_c$, $\beta_p$, K3 or K4, and $P_{mo}$ for a correction value common to all print sizes, a correction value for a specific print size, a constant which is any one of integers including 0 (zero), and a number of drive pulses obtained by dividing a distance of movement of the masking frame by a distance $d_m$ of movement of the masking frame per one pulse, respectively, the corrected number of drive pulses $P_m$ is obtained by calculating the following expression:

$$P_m = P_{mo} + (\beta_c - K3) + (\beta_p - K4)$$

To correct the location of an image on a print, it is desired to use a parameter or an apparent distance D between a reference position where the masking frame has a maximum masking opening and the cutter. The distance D is obtained by calculating the following expression:

$$D = D_o + (\gamma_c - K5) + (\gamma_p - K6)$$

where $D_o$ is a designed distance between the reference position and the cutter;
$\gamma_c$ is a correction value common to all print sizes;
$\gamma_p$ is a correction value for a specific print size; and
K5, K6 is a constant which is any integer including 0 (zero).

The correction values $\alpha_c$, $\alpha_p$, $\beta_c$, $\beta_p$, $\gamma_c$ and $\gamma_p$ are previously given and stored in a memory upon inspecting the assembled printer or installing the printer.

The transporting mechanism and the masking frame of the printer changes in mechanical characteristic with age or due to the replacement of parts. Therefore, the print size correction values $\alpha_p$, $\beta_p$ and $\gamma_p$ are renewed if a print is different in size from a desired standard size. The common correction values $\alpha_c$, $\beta_c$ and $\gamma_c$ are not changed with an exception of particular cases.

For renewal of the print size correction values $\alpha_p$, $\beta_p$ and $\gamma_p$, values A1, A2 and A3 are stored in the memory so as to renew previously memorized print size correction values $\alpha_p$, $\beta_p$ and $\gamma_p$. When taking $X_o$; $M_o$; $\alpha_c$, $\beta_c$ or $\gamma_c$; $\alpha_p$, $\beta_p$ or $\gamma_p$; X; M; $W_L$ and $W_R$; and $w_L$ and $w_R$ for a length of a P size print; a length of an image area of the P size print; a common correction value for the P size print; a print size correction value for the P size print; a measured length of an actual print; a measured length of an image area of the actual print; measured widths of left and right margins of the P size print; and expected widths of left and right margins, respectively, the values A1, A2 and A3 are obtained by calculating the following expressions:

$$Z1 = X/X_o, \text{ and } A1 = \alpha_p/Z1;$$

$$Z2 = (M - M_o)/2d_m, \text{ and } A2 = \beta_p + Z2;$$

and $$w_L = W_L + (Z1 - 1.0) \times L_u$$

$$w_R = W_R - (Z1 - 1.0) \times L_u$$

$$Z3 = (w_R - w_L)/2 \text{ and}$$

$$A3 = \gamma_p + Z3;$$

respectively.

Because the number of drive pulses for the pulse motors for the photographic paper and the masking frame are corrected by use of common correction values and print size correction values, any standard size print can be provided.

BRIEF DESCRIPTION OF THE DRAWINGS

FIGS. 5(a) to 5(f) are diagrams showing transported distances of a photographic paper upon making a print with end margins;

FIGS. 6(a) to 6(g) are diagrams showing transported distances of a photographic paper upon making a print with no end margins.

DETAILED DESCRIPTION OF THE INVENTION

Figure 1:
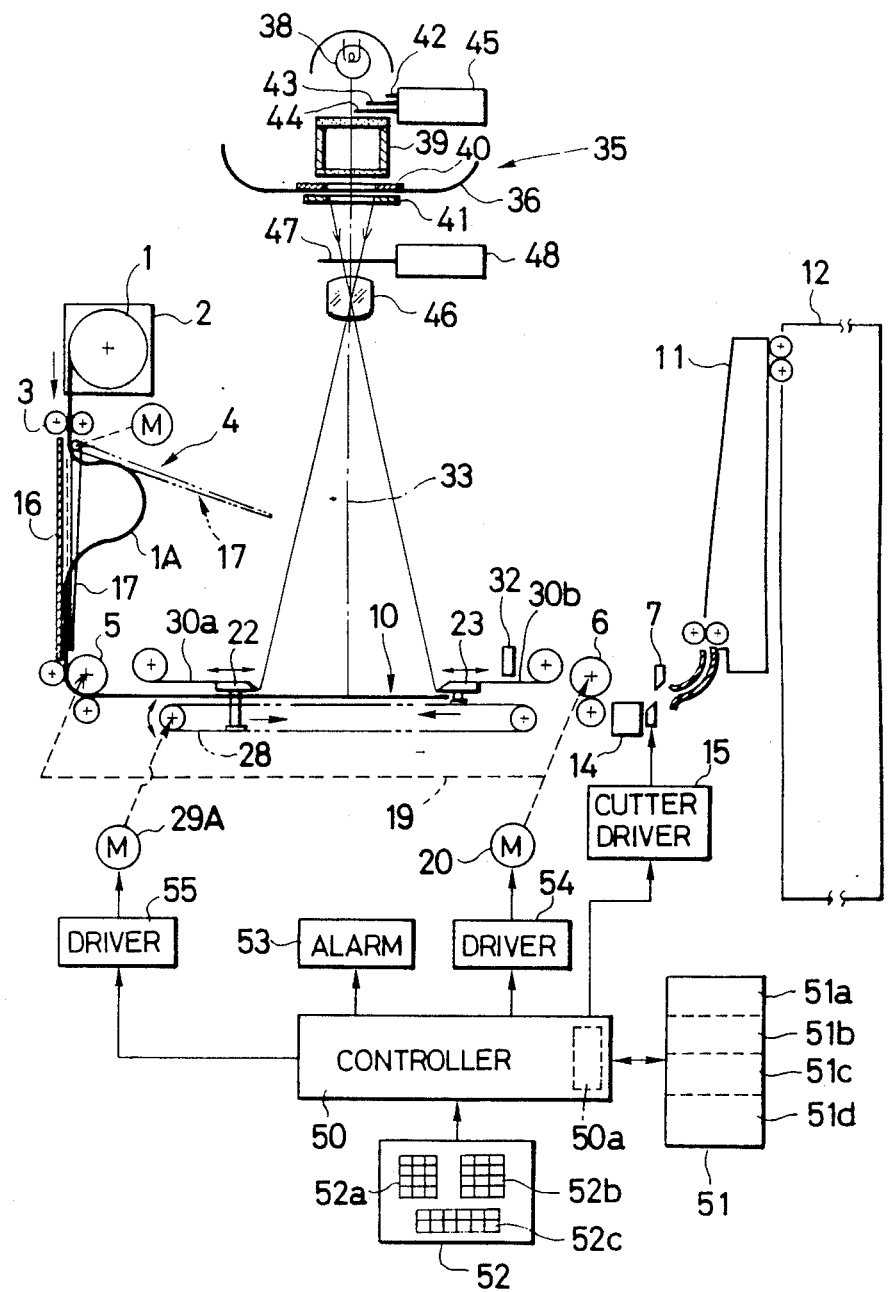
FIG. 1 is a schematic illustration showing a printer-processor which embodies the method of the present invention.

Referring to the drawings, in particular to FIG. 1, a printer-processor embodying the present invention is shown, provided with a removable paper magazine 2 containing a roll of a color photographic paper 1. The photographic paper 1 is withdrawn from the magazine 2 by means of a pair of rollers 3 and grasped by means of an upstream side transporting roller 5 so as to be transported to an exposure station 10 through a loop forming station 4. The photographic paper 1 is further grasped by means of a downstream side transporting roller 6 and transported toward a cutter 7. When the leading end of the photographic paper 1 is detected by means of an edge sensor (not shown) disposed just after the cutter 7, the transporting rollers 5 and 6 are stopped and the cutter 7 is actuated to cut off an end portion of the photographic paper 1.

Before printing, the photographic paper 1 is slightly moved back so as to locate the leading edge thereof at a predetermined distance before the cutter 7. After exposure, the photographic paper 10 is moved forward until one exposed frame of the photographic paper 1 is put downstream from the cutter 7. During the movement of the photographic paper 1, the printing machine 14 prints necessary print data, such as a frame number and the like, on the back surface of the photographic paper 1. Thereafter, the exposed part is cut off from the photographic paper 1 by the cutter 7 to form an exposed sheet of predetermined size. The exposed sheet is temporarily stored in a stocker 11 and transferred into a processor 12 for a collective processing as is well known in the art. Finished sheets are delivered as predetermined size print into a tray (not shown).

The loop forming station 4 is provided with a stationary guide plate 16 for guiding the photographic paper 1, a movable guide plate 17 disposed along the stationary guide plate 16 and a motor 18 moving the movable guide plate 17. The movable guide plate 17 is moved between a guide position where it is turned down to form a guide passage for the photographic paper 1 in cooperation with the stationary guide plate 16 therebetween and a looping position where the movable plate 17 is turned up to allow the photographic paper to form a loop A when the leading end of the photographic paper is moved back.

The transporting rollers 5 and 6, which forward the photographic paper, are driven by a belt 19 cooperating with a pulse motor 20 and synchronized with each other.

Figure 2:
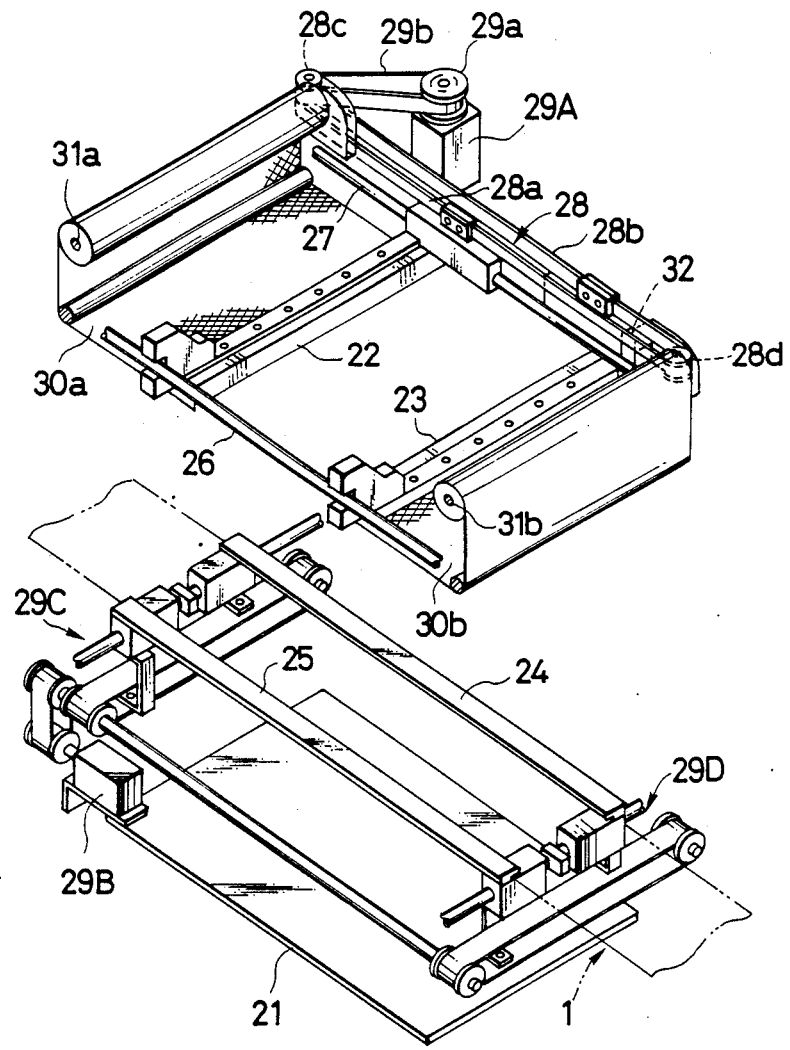
FIG. 2 is an exploded perspective view showing a variable masking frame unit used in the printer-processor shown in FIG. 1.

In the exposure station, there is a pressure plate 21, shown in FIG. 2, that holds the photographic paper 1 horizontally flat. A variable masking frame unit 30, which is variable in masking size, is disposed close to the pressure plate 21. The variable masking frame unit 30 consists of a pair of lengthwise frame members 22 and 23 and a pair of transverse frame members 24 and 25. Each lengthwise frame member 22, 23 is slidably supported by means of a pair of guide rods 26 and 27 for movement in a direction in which the photographic paper is moved forward and backward. The lengthwise frame members 22 and 23 are connected to inner and outer parts 28a and 28b of an endless belt 28 stretched in the lengthwise direction between pulleys 28c and 28d. Because the pulley 28c is coupled to an output shaft 29a of a pulse motor 29A by means of belt 29b, the longitudinal frame members 22 and 23 are driven by the pulse motor 29A so as to move away from and close to each other, thereby changing the length of the mask opening defined by the variable masking frame unit 30. The lengthwise frame members 22 and 23 have attached thereto the ends of light shield members 30a and 30b, which are rolled on core rollers 31a and 31b, respectively. These light shield members are made of cloth, or other flexible sheet materials. The core rollers 31a and 31b are urged by means of coil springs (not shown) to properly tension the light shield members 30a and 30b, thereby keeping the light shield members 30a and 30b apart from the surface of the photographic paper 1.

The transverse frame members 24 and 25 are incorporated with a pair of moving mechanisms 29C and 29D including endless belts which are driven by a pulse motor 29B. Because the moving mechanisms 29C and 29D are substantially identical in structure and operation to that for the lengthwise frame members 22 and 23, no further description will be given herein. When the pulse motor 29B rotates, the transverse frame members 25 and 26 are moved away from or close to each other, thereby changing the width of the mask opening defined by the variable masking frame unit 30. That is, if a print that is framed with a white margin is desired, the transverse frame members 25 and 26 are not moved and maintained as shown in FIG. 2 so as to overlap and guide the side margins of the photographic paper 1. On the other hand, if a print without a white margin is desired, the transverse frame members 25 and 26 are moved away from the passage of the photographic paper 1. The transverse frame members 25 and 26 are also moved when different size photographic papers are used according to the widths thereof.

Referring back to FIG. 1, a position sensor 32 is disposed to detect the lengthwise frame member 23 at a reference or starting position where the mask opening is maximum. Disposed above the exposure station 10 is a printing optical system 35 for printing an image of a color negative film 36 on the photographic paper 1 at a desired magnitude. There are three complementary color filters 42, 43 and 44, namely cyan, magenta and yellow. Each color filters 42, 43, 44 is controlled by a filter controller 45 so as to be inserted independently of the other two between an illumination lamp 38 and a diffusion mirror box 39 which comprises a square hollow tube having inner mirrored walls and top and bottom diffusion plates. The white light from the illumination lamp 38 passes through the color filters 42, 43, 44 into the diffusion mirror box 39 and is diffused thereby. The diffused light after passing through the color negative film 36 placed between a negative carrier 40 and a masking frame 41 so as to be held flat in an exposure position, is focused on the photographic paper 1 by means of a printing lens 46 which is desirably a zoom lens and creates a latent image of the color negative film 36 under the control of a shutter 47 which is controlled by a shutter controller 48 to open for a certain time, providing a standardized exposure time. The printing zoom lens 46 is changed in focal length either manually or automatically according to a desired magnitude of print.

A controller 50, which basically consists of a well-known microcomputer having an operation control circuit 50a, controls the pulse motors 20, 29A and 29B, the cutter 7, the printing machine 14, the printing optical system 35, etc. The operation control circuit 50a calculates correction values and the numbers of pulses to be applied to the pulse motors 20 and 29 for drive correction. A memory 51 connected to the controller 50 has four memory areas 51a, 51b, 51c and 51d for storing therein data representative of standardized print sizes, values of correction drive pulse numbers, an operation sequence for obtaining the correction values and the values of correction drive pulse numbers and a program for printing, respectively.

A keyboard 52 has various keys such as print size specifying keys 52a, data keys 52b and operation keys 52c through which necessary commands are input. An alarm device 53 is connected to the controller 50 to indicate an error caused by inputting wrong data. Drivers 54 and 55 are connected to the controller 50 to drive the pulse motors 20 and 29, respectively.

Figure 3:
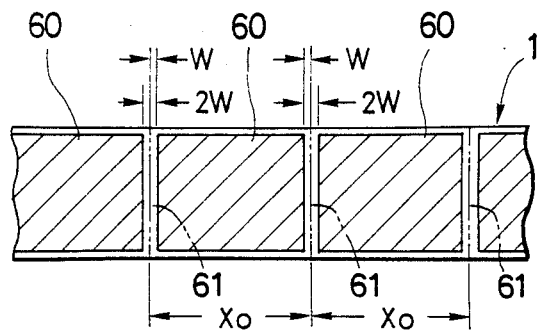
FIG. 3 is a partial illustration of an exposed photographic paper for the purpose of showing an image area with end margins and a cutting line.

Referring to FIG. 3, the exposed part of the photographic paper 1 is shown for explaining exposed areas and cutting lines when prints are framed with a white margin. If the paper transporting mechanism and the variable masking frame unit 30 are properly adjusted and controlled, exposure areas 60 are formed on the photographic paper 1 at regular spacings of 2W, and the photographic paper 1 is cut along a cutting line 61 which is drawn as a center line of each spacing to a standard length $X_o$. Therefore, each print has an overall length of $X_o$ and end margins of a width of W. The value of W is desirably adjusted by inputting data through the key 52a and usually set to 4 mm for all sizes of prints. Side margins of each print are defined by the transverse frame members 24 and 25 and usually 4 mm.

Figure 4:
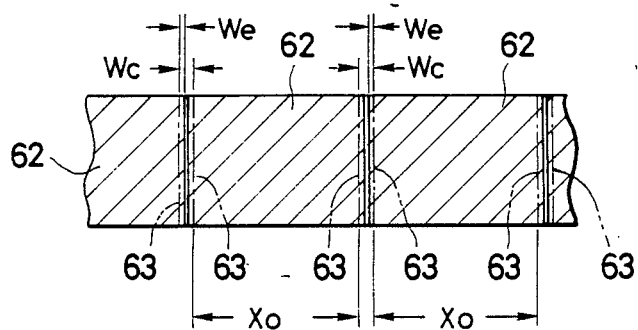
FIG. 4 is a partial illustration of an exposed photographic paper for the purpose of showing an image area with no end margins and a cutting line.

If prints without a margin are desired, the exposing area 62 is broadened and has an overall length that is $2W_e$ greater than the standard length $X_o$, as shown in FIG. 4. The photographic paper 1 is cut off along a cutting line drawn at a distance $W_e$ inside each end of the exposure area 62, providing a print having an overall length $X_o$ that is the standard size. The value of $W_E$ is usually set to 1 mm for all sizes of prints. Because the exposing areas 62 are arranged at regular spacings of 1 mm, an edge of a width $W_c$ of 3 mm is cut away and waste the cutting of a print.

When making a print with a white margin from the color negative film 36, the color negative film 36 is placed in the exposure station so as to locate a desired picture frame between the negative carrier 40 and the masking frame 41 so as to hold it flat. Data of a desired print size and format are designated through the keys 52a and data of the size of the negative film 36 is entered through the keys 52b. According to the entered data, the controller 50 reads out data of a standard print size and adjusts the mask opening or the opening of the variable masking frame unit 30 to the standard print size. Referring to FIG. 5, if $M_m$ and $X_o$ in mm represent the maximum length of the opening of the variable masking frame unit 30 and the length of the designated standard print size, respectively, the length of the mask opening $M_o$ to be adjusted is:

$$M_o = X_o - 2W$$

To adjust the mask opening to $M_o$, the distance S by which the respective lengthwise frame members 22 and 23 should be moved is obtained as follows:

$$\begin{aligned} S &= (M_m - M_o)/2 \\ &= (M_m - X_o + 2W)/2 \end{aligned} \quad (1)$$

Because the length $M_m$ and the width W are constant, the distance S is dependent on the designated print size $X_o$ only.

The controller 50 causes the driver 55 to rotate the pulse motor 29A so as to return the lengthwise frame members 22 and 23 to their starting positions and then reverse it so as to move the lengthwise frame members 22 and 23 close to each other, adjusting the length of the mask opening to the length $M_o$. If data of distances S for various print sizes are stored in a memory 51, the variable masking frame unit 30 is quickly adjusted responding to the designation of a desired print size.

When operating the operation key 52c for starting printing, the controller 50 causes the driver 54 to rotate the pulse motor 20 in a reverse direction so as to move back the photographic paper 1, locating the leading edge of the photographic paper 1 from the position of the cutter 7 shown in FIG. 5(a) to a position shown in FIG. 5(b). If $D_o$ represents the distance between the cutter 7 and the reference position of the variable masking frame unit 30, the distance $L_u$ by which the photographic paper 1 should be moved back is:

$$L_u = D_o + (M_m - X_o)/2 \quad (2)$$

After the backward movement of the photographic paper 1, the shutter 47 is opened for a proper exposure time to create a latent image of the picture frame of the color negative film 36 in a well-known manner. Thereafter, the controller 50 causes the driver 54 to rotate the pulse motor 20 in a normal direction so as to move the photographic paper 1 forward by the distance $L_u$ as shown in FIG. 5(c). The printing machine 14 is actuated to print necessary data on the back surface of the exposed part of the photographic paper 1. Thereafter, the pulse motor 20 is started again and moves the photographic paper 1 forward by a predetermined distance $L_p$, for example 10 mm, as shown in FIG. 5(d). At this time, the printing machine 14 is actuated again to print other data on the back surface of the exposed part of the photographic paper 1.

Thereafter, the photographic paper 1 is further moved forward by the length $X_o$ as shown in FIG. 5(e). The cutter 7 is actuated to cut off the exposed part of the photographic paper 1 as shown in FIG. 5(f), providing a separate exposed sheet 1a. The separate exposed sheet 1a is temporarily stored in the stocker 11. When a predetermined number of separate exposed sheets 1a are stored in the stocker 11, they are processed altogether in a well-known manner, providing prints of a standard size.

When another print of the same standard size is desired, the leading edge of the photographic paper 1 is moved back by the distance $L_u$. Thereafter, the same printing procedure is repeated.

If a print of another size is desired, data of the print size is entered through the keyboard 52 to change the size of the mask opening of the variable masking frame unit 30 the distance $L_u$ by which the photographic paper should be moved back, in the same manner as described previously. Thereafter, the same printing procedure is performed.

When making a standard print size $X_o$ of print with no margin from a picture frame of the negative film 36, the length $M_o$ in mm of the mask opening of the variable masking frame unit 30 is obtained as follows:

$$M_o = X_o + 2W_e$$

wherein $W_e$ is a spacing between the adjacent two exposure areas 62 and set to 1 mm independently from the printing size.

Hence, the distance S by which the lengthwise frame mask members 22 and 23 should be moved in the opposite directions is obtained as follows:

$$\begin{aligned} S &= (M_m - M_o)/2 \\ &= (M_m - X_o - 2W_e)/2 \end{aligned} \quad (3)$$

The distance $L_u$ by which the photographic paper 1 should be moved back is obtained as follows:

$$L_u = D_o + (M_m - X_o)/2 - W_c \quad (4)$$

As apparent from the equation (4), the length of the standard size $X_o$ of print with no margin is shorter by a width $W_c$ (3 mm) than that of the same size of print with a margin.

After the adjustment of the mask opening of the variable masking unit 30, the pulse motor 20 is caused to rotate in the reverse direction of rotation to move back the photographic paper 1 by the distance $L_u$ as shown in FIG. 6(b). The shutter 47 is opened and closed to expose the photographic paper 1 at the exposure station 10. After making an exposure for the picture frame of the negative frame 36, the pulse motor 20 is again caused to rotate but in the normal direction of rotation to move forward the photographic paper 1 by the distance $(L_u+W_c)$, positioning the leading edge of the photographic paper 1 at a position beyond the cutter 7 by the distance $W_c$ as shown in FIG. 6(c). The cutter 7 is actuated to cut away the leading part 1b of the photographic paper 1 of a width of $W_c$ as shown in FIG. 6(d). The cut away part 1b of the photographic paper 1 is thrown into a waste box (not shown) disposed below the cutter 7. Thereafter, the same procedure as for the print with end margins is repeated to provide a separate exposed sheet 1a which has a length of $X_o$.

As was previously described, there are possible cases that the paper transporting mechanism and the variable masking frame unit 30 do not work accurately as they are designed. In such cases, finished prints possibly have a size slightly different from a desired print size. To correctly adjust the prints to desired print sizes, in the method in accordance with the present invention, the numbers of drive pulses applied to the pulse motors 20 and 29 associated with the paper transporting mechanism and the variable masking frame unit 30 are corrected. That is, the number $P_f$ and $P_m$ of drive pulses applied to the pulse motors 20, 29 as follows:

$$P_f = (\alpha_c/K1) \times (\alpha_p/K2) \times P_{fo} \quad (5)$$

and $$P_m = P_{mo} + (\beta_c - K3) + (\beta_p - K4) \quad (6)$$

where $\alpha_c$ is a common correction value (a real number);
$\alpha_p$ is a print size correction value (a real number);
$P_{fo}$ is the number of pulses (counted fractions of 0.5 and over as a unit and disregarded the rest) that is the value of an actually transported distance of the photographic paper divided by a designed unit paper transporting distance $d_f$ per one pulse:
$\beta_c$ is a common correction value (an integer);
$\beta_p$ is a print size correction Value (an integer):
$P_{mo}$ is the number of pulses (counted fractions of 0.5 and over as a unit and disregarded the rest) that is the value of an actually shifted distance S of the frame member divided by a designed unit paper transporting distance $d_m$ per pulse;
K1 and K2 are constants (integers other than zero); and
K3 and K4 are constants (integers including zero).

For example, upon moving back the color photographic paper 1, the number of drive pulses $P_{fo}$, which is obtained by calculating $L_u/d_f$, is substituted into the expression (5) so as to obtain the corrected number of drive pulses $P_f$. The pulse motor 20 is applied with the corrected number of drive pulses $P_f$ so as to move back the color photographic paper 1 to the specified position. Similarly, the corrected number of drive pulses $P_m$ is obtained from the expression (6) so as to adjust the opening size of the variable masking frame.

The length of print $X_o$ and the opening size of the masking frame $M_o$ are properly adjusted by calculating the numbers of drive pulses for the pulse motors 20 and 29. However, if the position sensor 32 is incorrectly located or if the center of the opening of the masking frame is misaligned with the optical axis 33 of the printing optical system, the exposure area is incorrectly defined with respect to the optical axis of the printing optical system, a print is formed with different widths of end margins or with one end margin. To avoid such wrong margins, the apparent distance D (mm) between the cutter 7 and the reference position of the variable masking frame unit 30 is calculated by using the following expression (7) and the resultant apparent distance $D_o$ is substituted for the distance $D_o$ in the expression (2) or (4) to obtain the distance $L_u$.

$$D = D_o + (\gamma_c - K5) + (\gamma_p - K6) \quad (7)$$

where $D_o$ is the designed distance between the cutter 7 and the reference position of the variable masking frame unit 30;
$\gamma_c$ is a common correction value (a real number);
$\gamma_p$ is a print size correction value (a real number); and
K5 and K6 are constants (integers including zero).

Because K1 to K6 are standard, any values can be used for these constants. It is desirable to choose K1 and K2 so that the correction values $\alpha_c$ and $\alpha_p$ are natural numbers. For example, the constants K1 to K6 are as follows:

K1, K2 . . . 1000
K3 to K6 . . . 100

The correction values used in the expressions (5) to (7) are calculated in the following manner. That is, upon assembling or installing the photographic printer-processor, a command for selecting a correction value setting mode is entered through the keyboard 52 and data are entered so that all of the correction values are identical to the constants, respectively. For example, if selecting a value of 1000 for K1 and K2, a value of 100 for K3 to K6, values to be entered for $\alpha_c, \alpha_p, \beta_c, \beta_p, \gamma_c$ and $\gamma_p$ are 1000, 1000, 100, 100, 100 and 100, respectively. Therefore, the expressions (5) to (7) are given as follows:

$P_f = P_{fo}$ . . . (8)
$P_m = P_{mo}$ . . . (9)
$D = D_o$ . . . (10)

Thereafter, after inputting data of a print size, which is desirably the ES size (82.5 × 117 mm), through the keyboard 52, printing is started. At this time, the correction numbers of drive pulses $P_f$ and $P_m$ are obtained from the expressions (8) to (10) for controlling the pulse motors 20 and 29, so as to adjust the length of movement of the photographic paper 1 and the opening size of the variable masking frame unit 30.

Figure 7:
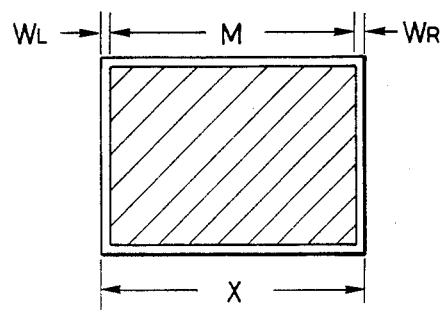
FIG. 7 is an illustration of dimensions of a print.

After printing, a command for selecting a correction value renewing mode is entered through the keyboard 52. In the case that a print made is such as having a size shown in FIG. 7, the length of the print X, the width of the image area M, the width of the right margin $W_R$ and the width of the left margin $W_L$ are measured and data of the results are entered through the keyboard 52. The controller 50 gives an alarm indicating that the data are incorrect when each measured size have an error of more than 20% of the standard size.

When each measured size is within the allowed error, the controller 50 calculates a ratio Z1 of the measured length X relative to the standard length $X_o$ and a value $\alpha_c$ from the following expressions (11) and (12), respectively:

$$Z1 = X/X_o \tag{11}$$

$$A1 = \alpha_c/Z1 = 1000/Z1 \tag{12}$$

The obtained value of A1 is stored in the memory 51 as a renewed common correction value $\alpha_c$ in place of the latest common correction value $\alpha_c = 1000$.

The operation means 50a calculates a value A2 from the following expressions (13) and (14):

$$Z2 = (M - M_o)/(2 \times d_m) \tag{13}$$

$$A2 = \beta_c + Z2 = 100 + Z2 \tag{14}$$

The obtained value of A2 is stored in the memory 51 as a renewed common correction value $\beta_c$ in place of the latest common correction value $\beta_c = 100$.

In similar manner, a value A3 is calculated from the following expressions (15) and (16):

$$Z3 = (\overline{w_R} - \overline{w_L})/2 \tag{15}$$

$$A3 = \gamma_c + Z3 = 100 + Z3 \tag{16}$$

where $w_R$ is an expected value corresponding to the size $W_R$ entered through the keyboard 52 when the correction value $\alpha_c$ is renewed with the obtained value A1 from the expression (12) and $\overline{w_L}$ is an expected value corresponding to the size $W_L$ entered through the keyboard 52 when the correction value $\alpha_c$ is renewed with the obtained value A1 from the expression. These expected values are obtained from the following expressions:

$$\overline{w_L} = W_L + (Z1 - 1.0) \times L_u$$

$$\overline{w_R} = W_R - (Z1 - 1.0) \times L_u$$

From the above operations or calculations, the common correction values $\alpha_c$, $\beta_c$ and $\gamma_c$ depending on the characteristics of the printer-processor are obtained and the respective values stored in the memory 51 are renewed with the obtained common correction values. Prints have different errors in finished size according to their print sizes due to the mechanical characteristics of the printer-processor. To make prints having correct standard sizes, correcting levels for various print sizes are changed differently from one another. For this purpose, a test print is made to determine the correction values $\alpha_p$, $\beta_p$ and $\gamma_p$ for each print size by using common correction values ($\alpha_c = 1000/A1$, $\beta_c = 100 + A2$, $\gamma_c = 100 + A3$) obtained in the common correction value renewing mode and standard print size correction values ($\alpha_p = 1000$, $\beta_p = 100$, $\gamma_p = 100$). Hence, the expressions (5) to (7) are rewritten as follows:

$$P_f = 1 \times (\alpha_p/1000) \times P_{fo} \tag{17}$$

$$P_m = P_{mo} + (\beta_c - 100) \tag{18}$$

$$D = D_o + (\gamma_c - 100) \tag{19}$$

From these expressions (17) to (19), the correction numbers of drive pulses $P_f$ and $P_m$ necessary to make prints having a desired print size are obtained for controlling the pulse motors 20 and 29, so as to adjust the length of movement of the photographic paper 1 and the opening size of the variable masking frame unit 30. Then, a test print is made.

Thereafter, the print size correction value renewing mode is selected and the dimensions of the test print are entered through the keyboard 52. The controller 50 calculates the expressions (11) to (16) to obtain values A1 to A3 and stores them in the memory 51 so as to renew the latest print size correction values $\alpha_p$, $\beta_p$ and $\gamma_p$, which are 1000, 100 and 100, respectively. For this renewal of the print size correction values, $\alpha_c$, $\beta_c$ and $\gamma_c$ in the expressions (12), (14) and (16) are replaced with $\alpha_p$, $\beta_p$ and $\gamma_p$, respectively. In such a manner as described above, by entering the dimensions of a test print through the keyboard 52, the print size correction values ($\alpha_p$, $\beta_p$, $\gamma_p$) are automatically renewed.

After installing the printer-processor, the common correction values and the print size correction values for a desired print size are read out from the memory 51 so as to control the pulse motors. Due to wear of parts of the printer-processor or the replacement of parts of the printer-processor, prints made by the printer-processor are apt to be substandard in size after prolonged use of the printer-processor. In such a case, the print size correction value renewal mode is selected to renew the print size correction values according to errored dimensions of prints. The renewal of the print size correction value $\beta_p$ is not conducted in any case other than that where $W_L$ and $W_R$ are equal to each other and 0 (zero), or $W_L$ and $W_R$ are not 0 (zero).

In the above described embodiment, whereas the common correction values $\alpha_c$, $\beta_c$ and $\gamma_c$ and the print size correction values $\alpha_p$, $\beta_p$ and $\gamma_p$ are automatically calculated by the use of the same expressions based on specific dimensions of a print actually made, nevertheless, the common correction values $\alpha_c$, $\beta_c$ and $\gamma_c$ may be manually input so as to automatically calculate the print size correction values $\alpha_p$, $\beta_p$ and $\gamma_p$. The common correction values are previously tabulated for deviations in size from various standard sizes. Otherwise, the common correction values $\alpha_c$, $\beta_c$ and $\gamma_c$ may be automatically calculated and then the print size correction values $\alpha_p$, $\beta_p$ and $\gamma_p$ may be read from a table and manually input.

Although the present invention has been fully described by way of the preferred embodiment thereof with reference to the accompanying drawings, it is to be noted that various changes and modifications are apparent to those skilled in the art. Therefore, unless otherwise these changes and modifications depart from the scope of the present invention, they should be construed as included therein.

What is claimed is:

1. A method of making a print by the use of a photographic printer of the type having a variable masking frame at an exposure position, said frame having a mask opening which is variable in size by means of a first pulse motor, a transporting system including a second pulse motor for transporting a photographic paper after exposure, and a cutter located apart from said exposure position, said print being made by exposing said photographic paper after moving back a leading end of said photographic paper from said cutter and then forwarding said exposed photographic paper to said cutter for separating the exposed part thereof from the rest of said photographic paper, said method comprising the steps of:

controlling a rotation of said first pulse motor by means of a corrected number of drive pulses $P_f$ obtained by calculating the following expression:

$$P_f = (\alpha_c K1) \times (\alpha_p/K2) \times P_{fo}$$

where $\alpha_c$ is a correction value common to all print sizes;
$\alpha_p$ is a correction value for a specific print size;
$K1, K2$ is a constant which is any integer other than 0 (zero); and
$P_{fo}$ is a number of drive pulses obtained by dividing a distance of transportation of said photographic paper by a distance $d_f$ of transportation of said photographic paper per one pulse; and controlling a rotation of said second pulse motor by means of a corrected number of drive pulses $P_m$ obtained by calculating the following expression:

$$P_m = P_{mo} + (\beta_c - K3) + (\beta_p - K4)$$

where $\beta_c$ is a correction value common to all print sizes;
$\beta_p$ is a correction value for a specific print size;
$K3, K4$ is a constant which is any one of integers including 0 (zero); and
$P_{mo}$ is a number of drive pulses obtained by dividing a distance of movement of said masking frame by a distance $d_m$ of movement of said masking frame per one pulse.

2. A method as defined in claim 1, further comprising controlling a rotation of said first pulse motor so as to move back said photographic paper by a distance $L_u$ which is determined by using as a parameter an apparent distance D between a reference position where said masking frame has a maximum masking opening and said cutter, said distance D being obtained by calculating the following expression:

$$D = D_o + (\gamma_c - K5) + (\gamma_p - K6)$$

where $D_o$ is a designed distance between said reference position and said cutter;
$\gamma_c$ is a correction value common to all print sizes;
$\gamma_p$ is a correction value for a specific print size; and
$K5, K6$ is a constant which is any one of integers including 0 (zero).

3. A method as defined in claim 1, further comprising storing values A1 and A2 in a memory, whereby renewing previously memorized print size correction values $\alpha_p$ and $\beta_p$ for a P size print, said values A1 and A2 being obtained by calculating the following expressions:

$$Z1 = X/X_o \text{ and } A1 = \alpha_p/Z1,$$

and $$Z2 = (M - M_o)/2d_m \text{ and } A2 = \beta_p + Z2,$$

respectively,
where $X_o$ is a length of the P size print;
$M_o$ is a length of an image area of the P size print;
X is a measured length of an actual print; and
M is a measured length of an image area of the actual print.

4. A method as defined in claim 1, further comprising storing values A1 and A2 in a memory, whereby renewing previously memorized common correction values $\alpha_c$ and $\beta_c$, said values A1 and A2 being obtained by calculating the following expressions:

$$Z1 = X/X_o \text{ and } A1 = \alpha_c/Z1$$

and $$Z2 = (M - M_o)/2d_m \text{ and } A2 = \beta_c + Z2,$$

respectively,
where $X_o$ is a length of a P size print;
$M_o$ is a length of an image area of the P size print;
X is a measured length of an actual print; and
M is a measured length of an image area of the actual print.

5. A method as defined in claim 2, further comprising storing values A1, A2 and A3 in a memory, whereby renewing previously memorized print size correction values $\alpha_p$, $\beta_p$ and $\gamma_p$ for a P size print, said values A1, A2 and A3 being obtained by calculating the following expression:

$$Z1 = X/X_o \text{ and } A1 = \alpha_p/Z1$$

$$Z2 = (M - M_o)/2d_m \text{ and } A2 = \beta_p + Z2$$

and $$\overline{W_L} = W_L + (Z1 - 1.0) \times L_u$$

$$\overline{W_R} = W_R - (Z1 - 1.0) \times L_u$$

$$Z3 = (\overline{W_R} - \overline{W_L})/2 \text{ and}$$

$$A3 = \gamma_p + Z3,$$

respectively,
where $X_o$ is a length of the P size print;
$M_o$ is a length of an image area of the P size print;
X is a measured length of an actual print;
M is a measured length of an image area of the actual print;
$W_L$ and $W_R$ are measured widths of left and right margins of the P size print; and
$\overline{W_L}$ and $\overline{W_R}$ are expected widths of left and right margins.

6. A method as defined in claim 2, further comprising storing values A1, A2 and A3 in a memory, whereby renewing previously memorized common correction values $\alpha_c$, $\beta_c$ and $\gamma_c$ said values A1, A2 and A3 being obtained by calculating the following expressions:

$$Z1 = X/X_o \text{ and } A1 = \alpha_c/Z1$$

$$Z2 = (M - M_o)/2d_m \text{ and } A2 = \beta_c + Z2$$

and $$\overline{W_L} = W_L + (Z1 - 1.0) \times L_u$$

$$\overline{W_R} = W_R - (Z1 - 1.0) \times L_u$$

$$Z3 = (\overline{W_R} - \overline{W_L})/2 \text{ and}$$

$$A3 = \gamma_c + Z3,$$

respectively,
where $X_o$ is a length of a P size print;
$M_o$ is a length of an image area of the P size print;
X is a measured length of an actual print;
M is a measured length of an image area of the actual print;
$W_L$ and $W_R$ are measured widths of left and right margins of the P size print; and
$\overline{W_L}$ and $\overline{W_R}$ are expected widths of left and right margins.

* * * * *